(12) United States Patent
Simonet

(10) Patent No.: US 10,307,872 B2
(45) Date of Patent: Jun. 4, 2019

(54) SYSTEM AND METHOD FOR CRIMPING A FASTENING COMPONENT ON A SUPPORT

(71) Applicant: BOLLHOFF OTALU S.A., La Ravoire (FR)

(72) Inventor: Frédéric Simonet, Beron (FR)

(73) Assignee: BOLLHOFF OTALU S.A., La Ravoire (FR)

(*) Notice: Subject to any disclaimer, the term of this patent is extended or adjusted under 35 U.S.C. 154(b) by 254 days.

(21) Appl. No.: 14/937,305

(22) Filed: Nov. 10, 2015

(65) Prior Publication Data

US 2016/0144466 A1    May 26, 2016

(30) Foreign Application Priority Data

Nov. 24, 2014    (FR) ...................................... 14 61327

(51) Int. Cl.
*B21J 15/02*    (2006.01)
*B21J 15/04*    (2006.01)
(Continued)

(52) U.S. Cl.
CPC ............. *B23P 11/005* (2013.01); *B21J 15/02* (2013.01); *B21J 15/04* (2013.01); *B21J 15/06* (2013.01);
(Continued)

(58) Field of Classification Search
CPC ... B21J 15/02; B21J 15/28; B21J 15/06; B21J 15/04; B21J 15/10; B21J 15/285; Y10T 29/49771; Y10T 29/49956; Y10T 29/49954; Y10T 29/49943; Y10T 29/49776; Y10T 29/53065; Y10T 29/53039
See application file for complete search history.

(56) References Cited

U.S. PATENT DOCUMENTS

| 6,851,167 B2 * | 2/2005 | Harlow | .................. B21J 15/285 29/243.5 |
| 7,200,909 B2 * | 4/2007 | Peckham | ................. B21J 15/10 29/243.54 |

(Continued)

FOREIGN PATENT DOCUMENTS

| DE | 102010035613 A1 | 3/2012 |
| EP | 0738550 A2 | 10/1996 |

(Continued)

OTHER PUBLICATIONS

Apr. 18, 2016 Search Report issued in European Patent Application No. EP 15192693.8.

*Primary Examiner* — Jermie E Cozart

(74) *Attorney, Agent, or Firm* — Oliff PLC

(57) ABSTRACT

A crimping system of a fastening component onto a support, including a crimping tool comprising a housing and a traction rod configured to cooperate with the fastening component so as to deform the fastening component when a translation of the traction rod takes place, a fluid source connected to the housing to supply a fluid under pressure to move the traction rod, a sensor to measure the movements of the traction rod, a detector to provide a pressurisation information of the fluid in the housing, and a control unit configured to record a curve of the measured movements and the pressurisation information of the fluid in the housing.

13 Claims, 1 Drawing Sheet

(51) Int. Cl.
 *B21J 15/06* (2006.01)
 *B21J 15/10* (2006.01)
 *B21J 15/28* (2006.01)
 *B25B 27/00* (2006.01)
 *B23P 11/00* (2006.01)

(52) U.S. Cl.
 CPC .............. *B21J 15/10* (2013.01); *B21J 15/28* (2013.01); *B21J 15/285* (2013.01); *B25B 27/0014* (2013.01); *Y10T 29/49771* (2015.01); *Y10T 29/49776* (2015.01); *Y10T 29/49943* (2015.01); *Y10T 29/49954* (2015.01); *Y10T 29/49956* (2015.01); *Y10T 29/53039* (2015.01); *Y10T 29/53065* (2015.01)

(56) References Cited

U.S. PATENT DOCUMENTS

2007/0101785 A1\* 5/2007 Peckham ................ B21J 15/02
 72/17.2
2010/0295696 A1\* 11/2010 Chu ...................... B21J 15/043
 340/686.1
2013/0180098 A1\* 7/2013 Schmidt ................ B21J 15/043
 29/525.06
2013/0200543 A1\* 8/2013 Ross ...................... B21D 31/04
 264/40.1

FOREIGN PATENT DOCUMENTS

| EP | 0995518 A2 | 4/2000 | |
|---|---|---|---|
| EP | 1712311 A1 | 10/2006 | |
| EP | 1 992 429 A1 | 11/2008 | |
| FR | 2724856 A1 | 3/1996 | |
| WO | WO 2005097375 A1 \* | 10/2005 | ............ B21J 15/043 |

\* cited by examiner

SYSTEM AND METHOD FOR CRIMPING A FASTENING COMPONENT ON A SUPPORT

BACKGROUND OF THE INVENTION

The invention relates to crimping of a fastening component on a support.

STATE OF THE ART

A fastening component to be crimped is an assembly element to fix another part onto a support, such as a screw, a nut or a plate. In particular, the component to be crimped comprises a head and a deformable body to form a crimping bead so as to fix the component onto the support, the crimping bead being designed to wedge the support with the head of the component. The component can be a nut or a rivet. A nut is a tapped hollow part, i.e. it comprises an internal thread designed to be fixed to another threaded part. A rivet is an assembly element for performing assembly of flat parts. In general, the fixing components are crimped onto the supports before final assembly.

At present, fixing components are crimped by means of a crimping tool which can be either operated manually or mounted on a robot. In particular, certain part assembly lines cannot be equipped with a robot and it is then necessary to use a manually operated crimping tool. Certain assembly lines are modular to enable a better flexibility for complex assemblies and are less automated. This is the case for example where the operator has to follow the progress of the assembly to perform his crimping operation.

European patent application EP0995518 can be cited which discloses a riveter for rivets provided with a mandrel, equipped with a device to supply the rivets in automated manner at one end of the riveter, and with a box to collect the broken mandrels after a riveting operation. Furthermore, the riveter comprises means for commanding a riveting cycle. In particular, the riveter comprises a hydraulic piston located in a housing and connected to jaws which enable taking the mandrel of a rivet, the piston being able to be moved in translation to exert a pull on the mandrel and deform the rivet. The riveter further comprises a hydraulic source connected to the housing by a hydraulic passage, a detection mechanism of the hydraulic pressure in the passage, and a controller connected to the detection mechanism and able to interrupt the hydraulic source when the hydraulic pressure drops below a predefined level indicating breaking of the mandrel. The riveter further comprises means for detecting a passage of a mandrel in the box and the controller stops the riveter when the passage of a mandrel is not detected when a certain time has elapsed after detection of breaking of the latter. But this automated system is complex and it only concerns rivets equipped with a mandrel. In particular, it is not suitable for nuts to be crimped for which a threaded traction rod is used to deform the nut, the nut not comprising a mandrel.

European patent application EP0738550 can be cited which discloses a system for setting a blind rivet and assessment of the acceptability of the setting, comprising a mechanism designed to take up the rod of a mandrel of the rivet to pull the latter, a first transducer to measure the force exerted on the rivet during setting, a second transducer to measure the movement of the traction mechanism, and a control circuit to determine the total energy used during setting of the rivet, from the measured movement and force, and to compare it with a desired predefined value. But the system is also complex and is not suitable for crimping nuts not comprising a mandrel.

OBJECT OF THE INVENTION

One object of the invention consists in palliating the shortcomings set out in the foregoing, and in particular in providing simple means for monitoring crimping of a fastening component on a support in order to ensure good setting conditions of the component.

According to one feature of the invention, a crimping system of a fastening component on a support is proposed, comprising:
 a crimping tool comprising a housing and a traction rod configured to cooperate with the fastening component so as to deform the fastening component when a translation of the traction rod takes place in the housing and along a longitudinal axis of the crimping tool,
 a fluid source connected to the housing to supply a fluid under pressure in the housing to move the traction rod, and
 measuring means, for example a sensor, to measure the movements of the traction rod.

The crimping system comprises detection means, for example a detector, to provide a pressurisation information of the fluid in the housing, and a control unit coupled to the sensor for receiving the movement measurements and coupled to the detector for receiving the pressurisation information, the control unit being configured to record a curve of the measured movements and the pressurisation information of the fluid in the housing when the translation of the traction rod takes place.

The proposed system is particularly simple as it enables a minimum amount of useful information to be provided for monitoring the quality of assembly of the fastening component on the support. Furthermore, such a system is suitable both for crimping of rivets equipped with a mandrel and also for crimping of nuts pulled by a threaded traction rod.

The crimping system may comprise a detector providing a first value of the pressurisation information when the pressure of the fluid exceeds a pressure threshold and a second value of the pressurisation information when the pressure of the fluid is lower than or equal to the pressure threshold.

The control unit can be coupled to the fluid source and configured to stop the fluid source when a measurement of the movement of the traction rod is strictly positive and the pressurisation information is zero.

The control unit can be configured to stop the fluid source when a measurement of the movement of the traction rod is zero and the pressurisation information is strictly positive.

The control unit can also be configured to stop the fluid source when a measurement of the movement of the traction rod is higher than a maximum threshold.

The control unit can further be configured to stop the fluid source when a maximum value of the measurements of the movement of the traction rod is lower than a minimum movement threshold or higher than a maximum movement threshold.

The fluid source can be a hydraulic or pneumatic source.

According to another feature, a method for crimping a fastening component on a support is proposed, comprising a crimping tool having a housing and a traction rod configured to cooperate with the fastening component so as to deform the latter when a translation of the traction rod takes place in the housing and along a longitudinal axis of the crimping tool, the method comprising the following steps:

supplying a fluid under pressure in the housing to move the traction rod, and measuring the movements of the traction rod.

The method further comprises the following steps:

detecting a pressurisation of the fluid in the housing, and recording a curve of the measured movements and a fluid pressurisation information in the housing when the translation of the traction rod takes place.

The method can comprise a source to supply the fluid and a stopping step of the fluid source when a measurement of the movement of the traction rod is strictly positive and the pressurisation information is zero.

The method can comprise a stopping step of the fluid source when a measurement of the movement of the traction rod is zero and the pressurisation information is strictly positive.

The method can further comprise a stopping step of the fluid source when a measurement of the movement of the traction rod is higher than a maximum threshold.

The method can also comprise a stopping step of the fluid source when a maximum value of the measurements of the movement of the traction rod is lower than a minimum movement threshold or higher than a maximum movement threshold.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION

Figure 1:
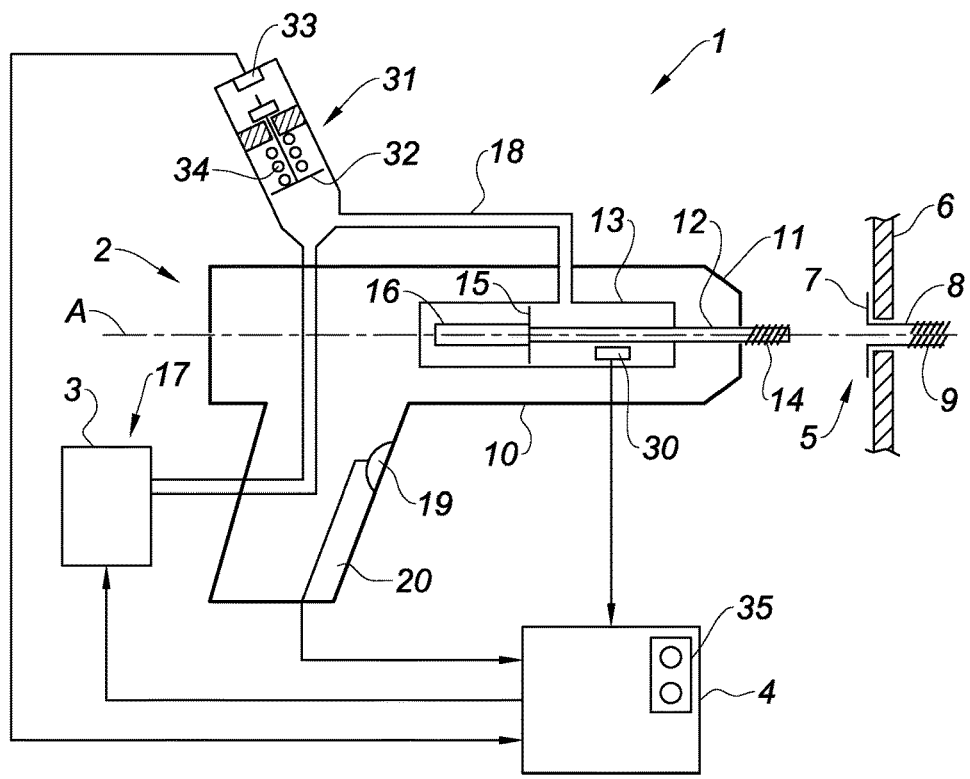
FIG. 1 schematically illustrates a cross-sectional view of an embodiment of a system for crimping a fastening component.

In FIG. 1, a crimping system 1 has been represented comprising a crimping tool 2, a fluid source 3, and a control unit 4. Crimping system 1 enables a fastening component 5 to be crimped on a support 6. Fastening component 5 can be a rivet provided with a mandrel, or a nut. Preferably, fastening component 5 is a nut comprising a support head 7 and a deformable body 8, deformable body 8 comprising an internal thread 9. Crimping tool 2 comprises a body 10 extending longitudinally along a longitudinal axis A, and a setting nose 11 located at one end of body 10. Crimping tool 2 further comprises a traction rod 12 located in a housing 13 of body 10 of tool 2. Traction rod 12 is configured to be mechanically coupled with fastening component 5. According to a preferred embodiment, traction rod 12 comprises a section provided with an external thread 14 designed to cooperate with internal thread 9 of fastening component 5 of nut type. According to another embodiment, traction rod 12 comprises jaws designed to cooperate with the mandrel of fastening component 5 of rivet type.

In a preferred embodiment, threaded section 14 of rod 12 is screwed into the internal thread 9 of nut 5 so that the movements made and the forces exerted by traction rod 12 are transferred to fastening component 5. Traction rod 12 also comprises a rear end 15, opposite the end comprising threaded section 14, mechanically coupled to a drive shaft 16. Drive shaft 16 and traction rod 12 are arranged in housing 13. Drive shaft 16 is animated in rotation and in translation with respect to the longitudinal axis A by a drive mechanism 17. Drive mechanism 17 comprises fluid source 3, housing 13 and a pipe 18 connecting housing 13 to fluid source 3 so as to convey the fluid under pressure in housing 13. Fluid source 3 can be a hydraulic source to supply a liquid, for example oil, under pressure in housing 13. As a variant, fluid source 3 can be a pneumatic source to supply a compressed gas, for example air, in housing 13. When drive shaft 16 is animated in rotation, it makes traction rod 12 rotate around the longitudinal axis A, in particular to screw rod 12 into nut 5. When drive shaft 16 is animated in translation, it causes translation of traction rod 12 along the longitudinal axis A, either backwards, i.e. in the opposite direction to setting nose 11, or forwards to move traction rod 12 back to its initial position. Backward translation of traction rod 12 enables fastening component 5 to be pulled so as to deform it to form a crimping bead, which enables the crimping operation to be performed. To cause deformation of fastening component 5, setting nose 11 is in contact with support head 7 of fastening component 5, and when backward traction of the rod 12 takes place, internal thread 9 of deformable body 8 moves towards support head 7 of component 5 and deformable body 8 deforms to form crimping bead. Deformation of nut 5 causes formation of crimping bead against support 6 to wedge the latter with support head 7. Traction rod 12 is then unscrewed and component 5 remains fixed to support 6.

Fluid source 3 is controlled by control unit 4 configured to activate or stop fluid source 3 in response to a pressure by the operator on a trigger 19 of crimping tool 2. Crimping tool 2 can further comprise a handle 20 to carry tool 2, when the tool is portable. As a variant, body 10 of the tool is fitted on the arm of a robot.

Crimping tool 2 further comprises measuring means 30 for measuring the movements C of traction rod 12, and detection means 31 to provide pressurisation information of the fluid in housing 13. Movement C of the traction rod is considered to be zero when traction rod 12 is in an initial position. When rod 12 is in a position to the rear of the initial position (whether rod 12 is animated in translation frontwards in the direction of setting nose 11 or backwards in the opposite direction), the movement is considered to be strictly positive and the value of the movement corresponds to the position of the rear end 15 with respect to its initial position. What is meant by value of the movement is the measured value of the movement of traction rod 12. The movement measuring means 30 can be a position sensor, for example an inductive or capacitive sensor. Measuring means 30 measure the position of traction rod 12 in real time during the crimping operation, i.e. the position information of rod 12 is provided continuously to control unit 4.

Detection means 31 can be a pressure switch which is activated when the fluid is under pressure in housing 13. A pressure switch is designed to detect when the pressure of a fluid exceeds a predefined value. Detection means 31 enable pressurisation information P of the fluid in housing 13 to be supplied to control unit 4. This information is binary, which simplifies crimping system 1. Indeed, unlike a sensor, such as movement measurements means 30, detection means 31 only indicate if the pressure of the fluid has exceeded a determined pressure threshold. In particular, the determined pressure threshold is higher than the pressure necessary for traction of rod 12 without the presence of fastening component 5 to be crimped, i.e. when traction rod 12 is not screwed into any nut, or when the jaws of traction rod 12 are not gripping any mandrel. Preferably, the determined pressure threshold is also lower than the pressure necessary for crimping of fastening component 5 which requires a minimum force. Fluid pressurisation information P enables an indication to be given to control unit 4 that a crimping cycle is in progress, in other words that drive mechanism 17 is under pressure. For example, detection means 31 comprise a piston 32 actuated by the fluid present in pipe 18, and an electric contactor 33. Electric contactor 33 detects a pressure in housing 13 higher than the determined pressure threshold. Furthermore, a return spring 34 enables piston 32 to be maintained in an initial position where the electric contactor is open and the pressurisation information P of the fluid in housing 13 is zero. When the pressure of the fluid increases, piston 32 moves and compresses return spring 34. Then, when the pressure of the fluid exceeds the determined pressure threshold, which is proportional to the stiffness of spring 34, piston 32 closes electric contactor 33. Return spring 34 further enables piston 32 to return to its initial position when the pressure of the fluid decreases and becomes lower than the determined pressure threshold.

Control unit 4 is configured to receive the movement measurements C of traction rod 12 and the fluid pressurisation information P supplied by measuring means 30 and detection means 31. The control unit 4 can comprise a processor configured to receive values of movement measurements C and the pressurisation information P, to stop and activate the source fluid 3, to record curves constructed from the received values, to compare these values and curves, and to emit signals. The movement of traction rod 12 characterizes the deformation of fastening component 5. Furthermore, control unit 4 is configured to monitor the validity of the values of the movement C of traction rod 12 and of the curve of the movements of traction rod 12. In other words, control unit 4 checks whether the crimping operation is compliant or not. The curve of the movements is constructed from the values of the movements during the crimping operation. Control unit 4 also records the values of the fluid pressurisation information P.

Control unit 4 can comprise indicating means 35 to indicate whether the crimping operation is compliant or not, for example with respect to a reference curve. Furthermore, control unit 4 records the curve of the values of the movement of traction rod 12 and the value of the fluid pressurisation information P over time during a crimping operation.

A crimping operation is considered to be compliant if all the following conditions are valid:
  there is no movement of the traction rod (C=0) before pressurisation of the fluid in the housing (P=0);
  there is a movement of the traction rod (C>0) after the fluid pressurisation information in the housing has been obtained (P=1);
  the measurements of the movement of traction rod 12 are lower than a maximum movement threshold Cmax;
  a maximum value MAX_C of the measured movements C of traction rod 12 is comprised between a minimum movement threshold Cmin and a maximum movement threshold Cmax;
  the curve of the movements of traction rod 12 is compliant after comparison with a reference curve.

Reference C corresponds to the movement of traction rod 12; reference P corresponds to the fluid pressurisation information. Furthermore, the movement C of rod 12 is zero when traction rod 12 is in its initial position (i.e. when the rear end 15 of traction rod 12 is in an initial position), the movement C is strictly positive when rear end 15 of traction rod 12 is in a position behind the initial position of rear end 15, i.e. in the opposite direction to setting nose 11, and the movement C is strictly negative when rear end 15 of traction rod 12 is in a position in front of the initial position of rear end 15, i.e. when rear end 15 of traction rod 12 is situated between the initial position of rear end 15 and setting nose 11. The fluid pressurisation information P is for its part zero when the pressure of the fluid is lower than or equal to the determined pressure threshold, and it is equal to "one" when the pressure of the fluid is strictly higher than the determined pressure threshold.

Control unit 4 records the curve of the movements of traction rod 12. It can further determine the maximum value MAX_C of the measurements of the movement of traction rod 12 during the crimping operation. For example, control unit 4 can compare the values of the measured movements with the maximum movement threshold Cmax and the minimum movement threshold Cmin. The values of the thresholds Cmax, Cmin are established according to the type of fastening component 5. Furthermore, control unit 4 can compare the recorded curve with a reference curve when the crimping operation is terminated. When the comparison of the recorded curve with a reference curve is made, the curve of the movements is considered to be compliant when the dispersion of the measurements, with respect to the values of the reference curve, is compliant, i.e. the measurements are comprised within a determined range. Control unit 4 can emit a compliant crimping signal, by means of indicating means 35, when all the compliance conditions of the crimping operation set out in the foregoing are valid.

Figure 2:
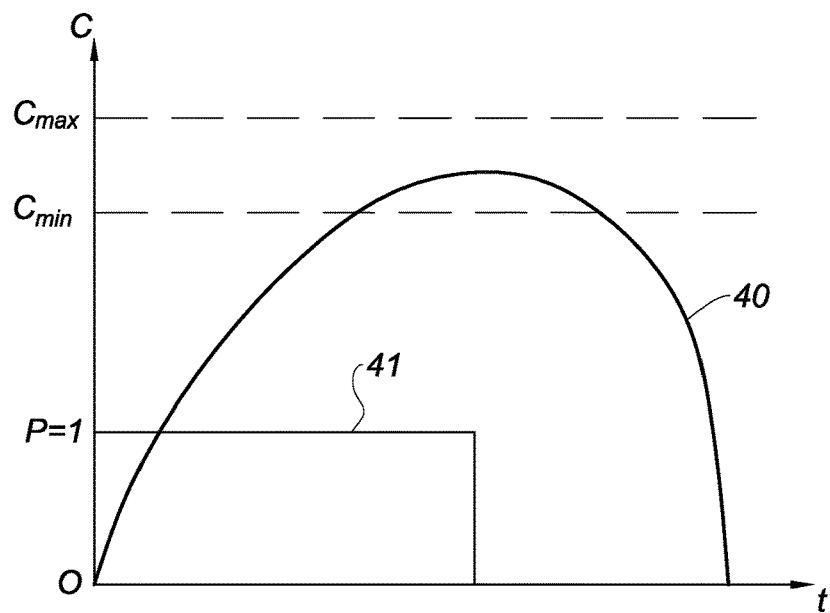
FIG. 2 schematically illustrates a curve of the movements of the traction rod of the crimping tool versus time.

In FIG. 2, a compliant curve 40 of the movements C of traction rod 12 has been represented. The curve 41 of the fluid pressurisation information P during a compliant crimping operation has also been represented in FIG. 2. It can be noted that during a compliant crimping operation, traction rod 12 is translated in the backwards direction, and the movement C is strictly positive and increases, then after formation of crimping bead, traction rod 12 is unscrewed and the rod returns to its initial position, the movement C remains positive and then decreases until it reaches zero value. During a compliant crimping operation, pressurisation P of the fluid in housing 13 is detected at the time a positive movement is measured. Then the movement changes and the curve is recorded at the end of the operation. The end of a crimping operation is determined when the fluid pressurisation information P goes from a value "one" to a zero value. When the end of the crimping operation is detected, control unit 4 records curves 40, 41. During the crimping operation, control unit 4 compares the values of the curve of the movements 40 with the maximum movement threshold Cmax and the minimum movement threshold Cmin. More particularly, control unit 4 compares the maximum value MAX_C of the curve of the movements 40 with the movement thresholds Cmax, Cmin, and indicates whether the cycle is compliant, in particular by means of indicating means 35.

On the contrary, a crimping operation is considered not to be compliant if at least one of the following conditions is valid:
  there is a movement of the traction rod (C>0) before a pressurisation of the fluid in the housing (P=0);
  there is no movement of the traction rod (C=0) after the fluid pressurisation information in the housing has been obtained (P=1);
  a measurement of the movement of traction rod 12 is higher than the maximum movement threshold Cmax;
  the maximum value MAX_C of the measured movements C of traction rod 12 is lower than the minimum movement threshold Cmin or higher than the maximum movement threshold Cmax;

the curve of the movements of traction rod 12 is not compliant after comparison with a reference curve.

When at least one condition indicating a non-compliant crimping operation is valid, control unit 4 stops fluid source 3, in particular to stop crimping tool 2 in order to avoid any risk of damage. In the case where there is a movement of the traction rod (C>0) before pressurisation of the fluid in the housing (P=0), it is detected that the crimping is incomplete, or that a crimping operation has taken place without a fastening component mechanically coupled with rod 12, or that traction rod 12 broke on starting of the crimping operation. In the case where there is no movement of the traction rod (C=0) after the information of fluid pressurisation in the housing has been obtained (P=1), there is an operating failure of drive mechanism 17.

It is also considered that the crimping operation is not compliant when the measurement of a movement of traction rod 12 is higher than the maximum movement threshold Cmax, in which case the crimping is excessive. Furthermore, the crimping operation is not compliant when the maximum value MAX_C of the measurements of the movement of traction rod 12 is lower than the minimum movement threshold Cmin, in which case the crimping is insufficient. It is also considered that the curve of the movements is not compliant when the measurements of the movements C are outside the determined range, i.e. the dispersion of the measurements is not compliant.

The crimping method can be implemented by crimping system 1 described in the foregoing. The method comprises the following steps:

supplying a fluid under pressure, by means of fluid source 3, in the housing to move traction rod 12, measuring the movements of traction rod 12 by means of measuring means 30, detecting pressurisation of the fluid in the housing by means of detection means 31, and recording a curve of the measured movements and the fluid pressurisation information in the housing when the translation of the traction rod is performed by means of control unit 4.

The method can further comprise the following steps:

stopping the fluid source when a measurement of the movement of the traction rod is strictly positive and the pressurisation information is zero, and/or stopping the fluid source when a measurement of the movement of the traction rod is zero and the pressurisation information is strictly positive.

The method can also comprise a step of comparison of the recorded curve with a reference curve and a stopping step of the fluid source when the recorded curve is not compliant. As a variant, the fluid source can be stopped when a maximum value MAX_C of the measurements of the movement of the traction rod is lower than a minimum threshold or higher than a maximum threshold.

The crimping system and the control method of a crimping tool are particularly simple and suitable for any type of fixing components, in particular for nuts and rivets.

The invention claimed is:

1. A crimping system for crimping a fastening component on a support, comprising:

a crimping tool comprising a housing and a traction rod configured to cooperate with the fastening component so as to deform the fastening component when a translation of the traction rod takes place in the housing and along a longitudinal axis of the crimping tool;

a fluid source connected to the housing to supply a fluid under pressure to the housing to move the traction rod;

a sensor configured to measure the movements of the traction rod;

a detector configured to provide a pressurisation information of the fluid in the housing; and a control unit coupled to the sensor for receiving the movement measurements and coupled to the detector for receiving the pressurisation information, the control unit being configured to record a curve of the measured movements and the pressurisation information of the fluid in the housing when the translation of the traction rod takes place, wherein the control unit is coupled to the fluid source and configured to stop the fluid source when:

a measurement of the movement of the traction rod is strictly positive and the pressurisation information is zero, a measurement of the movement of the traction rod is zero and the pressurisation information is strictly positive, a measurement of the movement of the traction rod is higher than a maximum threshold, or a maximum value of the measurements of the movement of the traction rod is lower than a minimum movement threshold or higher than a maximum movement threshold.

2. The crimping system according to claim 1, wherein the detector provides a first value of the pressurisation information when the pressure of the fluid exceeds a pressure threshold and a second value of the pressurisation information when the pressure of the fluid is lower than or equal to the pressure threshold.

3. The crimping system according to claim 1, wherein the control unit is coupled to the fluid source and configured to stop the fluid source when a measurement of the movement of the traction rod is zero and the pressurisation information is strictly positive.

4. The crimping system according to claim 1, wherein the control unit is coupled to the fluid source and configured to stop the fluid source when a measurement of the movement of the traction rod is higher than a maximum threshold.

5. The crimping system according to claim 1, wherein the control unit is coupled to the fluid source and configured to stop the fluid source when a maximum value of the measurements of the movement of the traction rod is lower than a minimum movement threshold or higher than a maximum movement threshold.

6. The crimping system according to claim 1, wherein the fluid source is a hydraulic source.

7. The crimping system according to claim 1, wherein the fluid source is a pneumatic source.

8. The crimping system according to claim 1, wherein the control unit is coupled to the fluid source and configured to stop the fluid source when a measurement of the movement of the traction rod is strictly positive and the pressurisation information is zero.

9. A method for crimping a fastening component on a support, comprising a crimping tool having a housing and a traction rod configured to cooperate with the fastening component so as to deform the fastening component when a translation of the traction rod takes place in the housing and along a longitudinal axis of the crimping tool, the method comprising the following steps:

supplying a fluid under pressure in the housing to move the traction rod;

measuring the movements of the traction rod;

detecting a pressurisation of the fluid in the housing; and recording a curve of the measured movements and a fluid pressurisation information in the housing when the translation of the traction rod takes place, the method further comprising a source to supply the fluid and a stopping step of the fluid source when:
- a measurement of the movement of the traction rod is strictly positive and the pressurisation information is zero,
- a measurement of the movement of the traction rod is zero and the pressurisation information is strictly positive,
- a measurement of the movement of the traction rod is higher than a maximum threshold, or
- a maximum value of the measurements of the movement of the traction rod is lower than a minimum movement threshold or higher than a maximum movement threshold.

10. The method according to claim 9, comprising a stopping step of the fluid source when a measurement of the movement of the traction rod is zero and the pressurisation information is strictly positive.

11. The method according to claim 9, comprising a stopping step of the fluid source when a measurement of the movement of the traction rod is higher than a maximum threshold.

12. The method according to claim 9, comprising a stopping step of the fluid source when a maximum value of the measurements of the movement of the traction rod is lower than a minimum movement threshold or higher than a maximum movement threshold.

13. The method according to claim 9, comprising a stopping step of the fluid source when a measurement of the movement of the traction rod is strictly positive and the pressurisation information is zero.

* * * * *